(12) United States Patent
Lewis

(10) Patent No.: US 6,233,576 B1
(45) Date of Patent: *May 15, 2001

(54) ENHANCED SECURITY FOR COMPUTER SYSTEM RESOURCES WITH A RESOURCE ACCESS AUTHORIZATION CONTROL FACILITY THAT CREATES FILES AND PROVIDES INCREASED GRANULARITY OF RESOURCE PERMISSION

(75) Inventor: Jonathan Rhys Lewis, Winchester (GB)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,256

(22) PCT Filed: Sep. 25, 1995

(86) PCT No.: PCT/GB95/02269

§ 371 Date: Nov. 14, 1997

§ 102(e) Date: Nov. 14, 1997

(87) PCT Pub. No.: WO96/42057

PCT Pub. Date: Dec. 27, 1996

(30) Foreign Application Priority Data

Jun. 9, 1995 (GB) .................................................. 9511730

(51) Int. Cl.[7] ........................................................ G06F 17/30
(52) U.S. Cl. .............................. 707/9; 709/229; 709/225
(58) Field of Search ........................ 707/9, 10, 1; 709/229, 709/225

(56) References Cited

U.S. PATENT DOCUMENTS

| | | | | |
|---|---|---|---|---|
| 5,263,157 | * | 11/1993 | Janis | 707/9 |
| 5,428,795 | * | 6/1995 | Johnson et al. | 395/728 |
| 5,446,903 | * | 8/1995 | Abraham et al. | 710/240 |
| 5,675,782 | * | 10/1997 | Montague et al. | 707/9 |
| 5,765,153 | * | 6/1998 | Benantar et al. | 707/9 |
| 5,771,379 | * | 6/1998 | Gore Jr. | 707/101 |
| 5,845,067 | * | 12/1998 | Porter et al. | 395/186 |
| 6,038,563 | * | 3/2000 | Bapat et al. | 707/10 |

OTHER PUBLICATIONS

Lee Badger, A Model for Specifiying Multi–Granularity Integrity Policies, Security and Privacy, May 1989 Proceedings IEEE Symposium, pp. 269–277, May 1989.*

* cited by examiner

Primary Examiner—John Breene
Assistant Examiner—Greta L. Robinson
(74) Attorney, Agent, or Firm—Jeanine S. Ray-Yarletts

(57) ABSTRACT

Provided is a scheme for implementing flexible control of subject authorizations (i.e. the authorizations which users or processes have) to perform operations in relation to computer resources. The methods, computer systems and authorization facilities which are provided by the invention enhance the security provisions of operating systems which have only very limited authorization facilities, by mapping the available operating system permissions to specified resource authorities for each of a set of aspects or characteristics of a computer system resource. Thus, the standard operating system permissions (e.g. read, write, execute) can have different meanings for different resource aspects, and an individual subject can have separate authorization levels set for the different resource aspects. The mappings between authorities and the available permissions may be different for different types of resources. The invention provides great flexibility in setting the authorizations that a subject may have in relation to particular resources.

15 Claims, 2 Drawing Sheets

Figure 1:
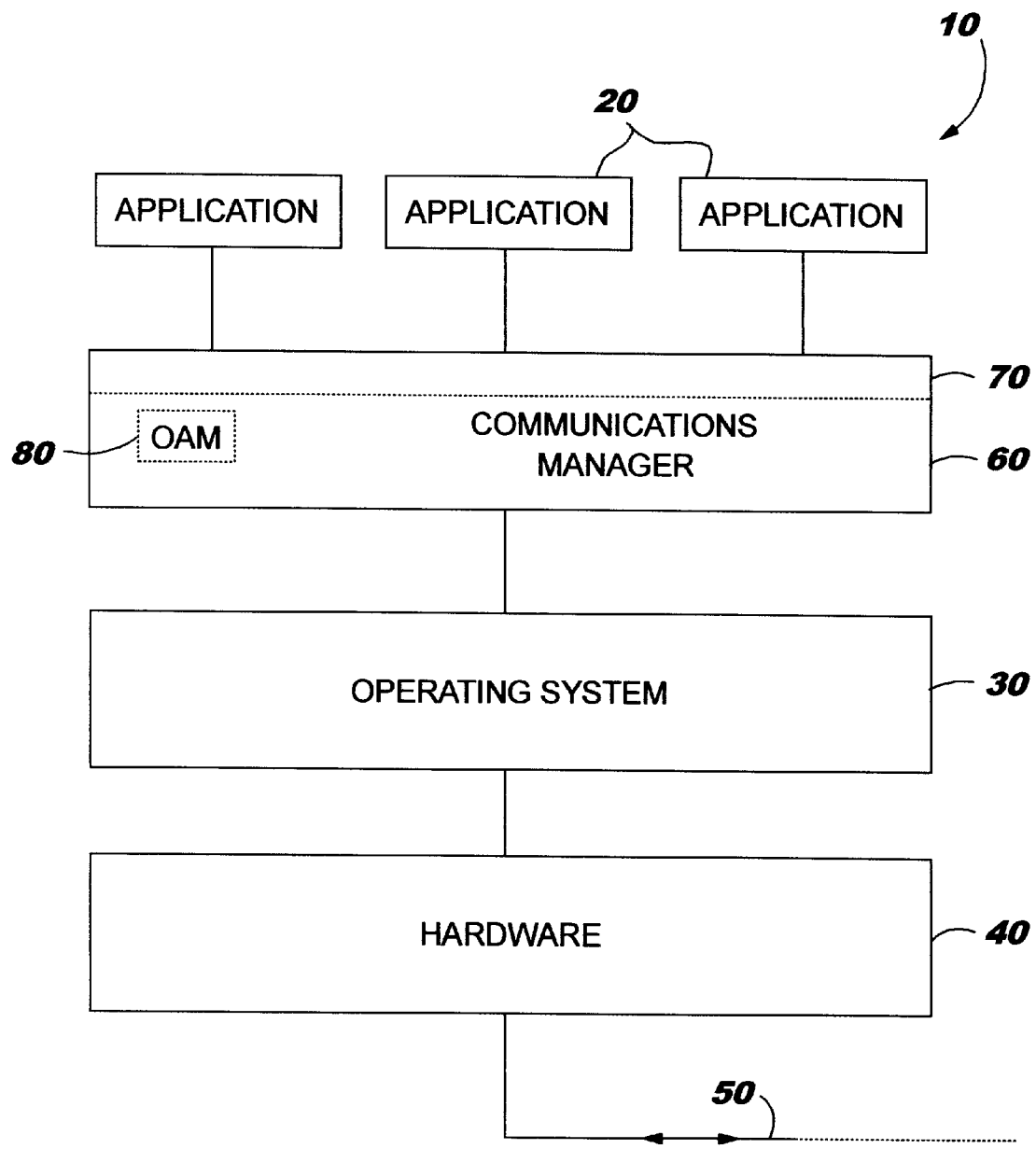

ENHANCED SECURITY FOR COMPUTER SYSTEM RESOURCES WITH A RESOURCE ACCESS AUTHORIZATION CONTROL FACILITY THAT CREATES FILES AND PROVIDES INCREASED GRANULARITY OF RESOURCE PERMISSION

FIELD OF THE INVENTION

The present invention relates to security for computer system resources, and more particularly to computer systems having flexible subject-authorization control and to methods and computer system components providing such subject-authorization flexibility in resource security controls.

BACKGROUND AND PRIOR ART

Since many data processing applications involve highly confidential and business critical information (for example national security applications, financial applications), computer resource security is of utmost importance. In addition to physical controls (such as building security locks) and procedural controls (such as changing passwords), logical controls such as access authorization control, authentication (checking that a user is who they say they are) and cryptographic techniques are important. Where large numbers of user terminals are interconnected in a distributed processing network, with storage devices and data files stored throughout the network commonly being accessible from a plurality of terminals, the provision of effective security is a significant technical problem.

Modern computers are sold with operating system software installed therein for controlling the execution of programs and providing basic services such as resource allocation, scheduling, input and output control, and data management. A "resource" may be any facility or element of a computing system or operating system required by a task (for example storage, input/output devices, processing units, printers, data sets, files, or programs). Many operating systems, such as IBM's MVS/ESA and OS/400 operating systems, additionally provide comprehensive facilities for defining and managing system security (e.g. MVS/ESA has the RACF facility). (IBM, MVS/ESA, OS/400 and RACF are trademarks of International Business Machines Corporation). In particular, such operating systems provide facilities for defining the access authorizations which particular subjects have in relation to specific system resources. Subjects are the active components in a network, such as processes, users or groups of users. The subjects are said to be authorised to perform certain operations, or to have particular "capabilities" or "permissions" with respect to a resource. As an example, a subject may be authorised to update a specific file.

However, not all operating systems provide security facilities of such sophistication, or even any security. In particular, the technical problem of providing effective and comprehensive security is compounded in open distributed systems since the "open" operating systems themselves generally have only limited security facilities built into them, and because of complexities which are not encountered with centralised networks. For example, a security system for a distributed network must have the ability for a user to authorize a computer to operate on the user's behalf and only to do so while authorised.

An open distributed processing environment is described in "Security Architecture for Open Distributed Systems", S. Muftic et al, Wiley, 1993, as one in which computer systems with diverse applications, resources, users, and locations exchange and process various types of data and interact without any previous strict arrangements. An open systems platform is the term given to systems developed for such an environment comprising computer system hardware and the associated operating system software which it runs. The UNIX operating system developed by Unix System Laboratories and IBM's AIX operating system are examples of open operating systems (AIX is a trademark of International Business Machines Corporation and UNIX is a trademark licensed through X/Open Company Limited). Computer networks constructed within such an open environment generally have less sophisticated security provision than networks of computers running operating systems such as the OS/400 operating system. Typically, application programs which are run on open systems platforms are restricted to very basic authorization mechanisms if they are used at all. The increasing importance of open systems solutions for commercial data processing and inter-enterprise computer networking has increased the need for improved protection of users, resources and assets in open computer networks.

For example, the file system authorization facilities provided by the UNIX operating system comprise only the following three basic permissions per file:

READ Subject can view the contents of a file;

WRITE Subject can modify the contents of a file;

EXECUTE Subject can execute the file (the file being a program or script).

Each permission is represented by a one bit field. The permissions are defined to enable three categories of subject or user to be distinguished, one set of bits being defined in each case. The first category is the owner of the file, the second is any user in the group of users associated with the file, and the final category is every other user. A file may be set up, for example, as readable and writable by its owner, readable by the group, and inaccessible to any other user.

The permissions on directories are similarly simple, differing slightly from the permissions on files, as follows:

READ User can list the directory;

WRITE User can create or delete files in this directory;

EXECUTE User can search the contents of the directory and make it the current directory.

This level of granularity of authorization clearly has very little flexibility and is not sufficient for many purposes—the authorization access controls are not expressive enough to specify a comprehensive security policy and the fact that the security facilities only apply to files and directories is a severe limitation. For example, a company may wish to transfer an existing commercial application program which deals with sensitive information and which was written for one computer system onto an open system platform (referred to as "porting" the application to the open system) and yet to maintain the sophisticated security control which was available on the first system. The authorization permissions of the UNIX system are too coarse to permit this without additional authorization control services.

The fact that the UNIX operating system does not provide an effective mechanism for establishing a secure computer system has already been noted in the prior art, for example in EP-A-0325777 which describes a mechanism for an open distributed system for auditing information which must be securely protected so that actions affecting security may be traced to the responsible user. EP-A-0325777 thus relates mainly to detection and indication of security problems, rather than to mechanisms for prevention of computer resource misuse.

One solution for systems with limited security provision is to rely on security mechanisms being implemented by the applications which run on the system, appropriate security measures being built into the applications on an individual basis. However, there remain the problems that such security measures tend to be of limited scope and applicability and are usually incompatible in larger distributed systems. The drawbacks of providing security in each application on an individual basis are identified by Muftic et al in "Security Architecture for Open Distributed Systems", Wiley, 1993, as follows:

1. The integration and functional completeness of the overall security system in a broader operational environment may not be feasible;

2. It is difficult to analyze and evaluate the overall strength of such a global security system;

3. Implementation, and therefore usage, of individual security algorithms, mechanisms, and services may be duplicated, or interfere with one another;

4. It is not easy to define a formal description of the global security system, suitable for its rigorous analysis; and 5. It is very inconvenient to establish a common security architecture and policy for integration and optimisation of individual security services.

The above-mentioned book goes on to describe the authors' views on the desirable features, protocols, services and mechanisms of a comprehensive security system architecture—i.e. setting out proposals for an architecture rather than methods of implementing flexible resource security using the existing security facilities of open distributed systems.

Other prior art systems have sought to provide additional preventative security mechanisms on top of the basic facilities of the operating system. EP-A-0561569 discloses restricting user access to a protected resource by requiring a call to a user monitor command, specifying the protected resource as a parameter, the user monitor command then checking that predetermined conditions are satisfied before permitting access to the protected resource.

U.S. Pat. No. 5,173,939 describes a basic access control model in which a reference monitor examines requests for access to particular system resources and decides whether to grant that access based on the resource, who the request is from, the resource operation specified in the request, and definitions of which users are listed as being authorised to perform the requested operation. U.S. Pat. No. 5,173,939 discloses attaching to particular objects or resources an access control list (ACL) which is a list specifying which users are authorised to perform a specific operation, seeking to minimize the information which must be retained in the ACL by defining a hierarchy of levels of authorization (i.e. if one entity is authorised to perform an operation then all entities having a higher authorization level are also authorised and so need not be listed in the ACL). Despite the reduction of information stored in the ACL's, such a system of storing authorization lists in association with system resources has an undesirable maintenance overhead. The problem of the inflexibility of security provision in open distributed systems is not addressed.

U.S. Pat. No. 5,220,604 discloses an authorization level hierarchy and a method for excluding certain groups from resource access. U.S. Pat. No. 5,220,604 describes the resources of the distributed computer system implementing their own security policy, the resource itself determining the access rights of a user when the user requests resource access and then the resource deciding whether to allow or reject the request. This is distinguished from the centrally managed resource access determinations which are typical in non-distributed systems. Systems such as described in U.S. Pat. No. 5,220,604 often rely on users being assigned user names, with access to resources being on the basis of the access rights known to be associated with a particular user name. This may be implemented by each system resource including a listing of all users and their access rights and user names, but the overhead of maintaining and updating all of the access control lists is considerable if numerous system resources exist and so this solution is often impractical. Alternatively, there may be a central list accessible to all resources of the network, with a global naming service providing user name resolution. In the invention of U.S. Pat. No. 5,220,604, an access control list provided for each system resource lists all possible access privileges and the users that have these privileges. When a user requests access to a resource, the user's name is compared to the resource's access control list; if the name is on the list then access will be granted. U.S. Pat. No. 5,220,604 provides no solution to the specific problem of the inflexibility or non-granularity of the authorization facilities which are available on open distributed systems.

SUMMARY OF INVENTION

The present invention makes use of the fact that a number of distinct "aspects" or characteristics are typically associated with any resource. A resource may be thought of as one instance of a particular resource class, with the class of resource to which the instance belongs being one "aspect". Configuration information associated with the particular resource instance may be a second aspect, and security attributes concerned with the ability to grant and revoke authorization for the resource instance may be a third aspect. Such different aspects or characteristics of a resource will be exemplified and described further below as part of the detailed description of an example embodiment of the invention. The significant point to note is that there are generally a number of separately identifiable aspects or characteristics associated with a typical system resource.

The present invention provides a method of implementing resource access authorization control in a computer system, the method comprising: for computer resources which are to be protected, identifying a set of resource aspects (e.g. resource class and resource data), particular instances of which are characteristic of a particular computer resource; defining resource authorities which subjects may have for each of said resource aspects, and storing said authorities in association with said resources; and defining subject authorizations for resource access in accordance with said defined resource authorities for said resource aspects, such that the subject authorizations are defined at the level of granularity of resource aspects.

In this context, the word "subject" may refer to a user or group of users of the computer resources, to an application program, or to another active entity of a computer network by or from which a resource operation may be requested. Authorities are the access rights which subjects have. The combination of an authority which a subject has and the relevant resource aspect to which the authority applies may be referred to as a "capability" of the subject.

The present invention preferably provides a flexible method of implementing resource access authorization control for computer resource security for operating systems in which a set of operating system permissions are defined for use in the authorization of subjects to perform operations in relation to specific resources, the method comprising: creating a set of files including a set of definitions of correspondence between the defined operating system permissions and specified resource authorities for each of a plurality of different aspects of a resource; storing said created files for association with a resource to be protected; setting subjects' authorizations in relation to said resource in terms of the defined operating system permissions, thereby defining the authorities which said subjects have in relation to the different resource aspects.

When a subject attempts to perform an operation in relation to a protected resource, subject authorization testing in accordance with an embodiment of the present invention includes the step of comparing the operating system permissions of the subject with said set of definitions of correspondence within the created files to determine whether the subject is authorised to perform the operation in relation to the protected resource. Such testing may use the standard methods which are provided by many open systems operating systems to enable applications to test the access rights which users have against files (i.e. using the standard methods to confirm user permissions and then comparing those permissions with the definitions of correspondence within the authorization files).

The files which are created according to the invention for use in setting and testing subject authorizations are preferably operating systems files and are referred to hereafter as authorization files or operating systems files.

The steps of creating, storing and setting may be performed by an authorization control service software component of a computer system. This may be under the control of a systems programmer, but it is preferred for authorisation files to be built automatically when a resource is created. The authorities for a particular resource type and the rules for mapping authorities to operating system permissions are predefined for the system to enable automated building of authorisation files. It is also preferred to automatically assign default authorisations to users when they create a resource. The default settings for subjects' authorisations may be definitions stored in administration files of the authorisations for named subject groups.

The present invention also provides a computer resource access authorization control facility for use with operating system software having security facilities including a set of definitions of operating system permissions for use in the authorization of subjects of system resources to perform operations in relation to said resources, the control facility including: means for creating a set of files including a set of definitions of correspondence between said operating system permissions and specified resource authorities for each of a plurality of different aspects of a resource; means for storing said created files in association with a resource to be protected; means for setting subjects' authorizations in relation to specific resources using said operating system permissions, thereby to set the authorities which said subjects have in relation to the different resource aspects; and means, responsive to a subject requirement for an operation to be performed, for comparing the subject's operating system permissions with the set of definitions of correspondence within the created files, thereby to determine whether the subject is authorised to perform the operation.

The present invention thus recognises that each of a plurality of different resource aspects may, for a particular instance of a resource, be considered separately and may beneficially have independent access authorities defined for each of them—i.e. the different aspects of a resource may each justify a different set of authority definitions for the access-authorization-controlled performance of operations on resources. Also, the different aspects of a resource may justify protection at a different level of granularity (e.g. some aspects being controlled at the resource instance level and others at the resource class level). The provision of different levels of granularity of access control for the different aspects of a resource is made possible by the present invention.

An important advantage of the invention is that it enables access authorizations to be set for computer resources other than files and directories. Computer systems and computer programs often require security to be provided for many objects or resources which they include or process, in addition to files and directories. Because the authorities for particular resource aspects can, according to this invention, be defined in accordance with actual security requirements for particular resources, a resource security system of great flexibility is made possible.

The present invention preferably uses the available operating system permissions, but increases the granularity and flexibility of the available subject authorizations by relating operating system permissions to specified resource authorities for the different aspects of a resource. The use of the existing security facilities has the advantage that these facilities have already been designed to deal with large numbers of objects (e.g. files) and have proven good performance. The invention enables authorization control to be at the granularity level of individual resource aspects and thereby enables the provision of a much more flexible and comprehensive authorization scheme for open distributed systems than is possible in systems in which the resource is the smallest entity in relation to which authorization controls are made available. For example, the invention enables the provision of flexible access authorization control using the basic three file permissions READ, WRITE and EXECUTE of the UNIX operating system.

The invention also enables the use of existing system interfaces, which reduces development cost and avoids system integration problems as compared with security mechanisms which necessitate the definition of new interfaces. Provision of a complex security manager component in each computer system of the network is not essential. A further advantage is that the invention does not require proliferation of security related data, which would itself need additional protection, as existing security data may be used.

Each resource to be protected is thus preferably associated with a set of operating system files (known as authorization files) which preferably contain no executable files or data other than the definitions of correspondences between the operating system permissions which particular subjects may have and the resource authorities of different resource aspects. Operating system services are used against the authorization files to set and to test the authorizations of particular subjects. The basic permissions of the operating system may be limited to, for example, three independent permissions per file and yet a flexible authorization scheme can be implemented if each resource has a number of authorization files associated with it in accordance with the present invention. The invention recognises the desirability of enabling each aspect of a resource to have a level of protection which is independent of the other aspects, and by enabling independent levels of security for different aspects the invention provides a flexible scheme for implementing resource security.

It is thus preferred that the present invention uses defined mappings between operating system permissions and resource authorities in the setting and testing of the operating system permissions that particular subjects have, providing a flexible scheme for defining authorizations and a method of authorization testing for use when subjects attempt to perform tasks in relation to protected resources, authorization flexibility being achieved even if the operating system permissions themselves are of very limited granularity and applicability. The mappings (i.e. the redefined "meanings" of the operating system permissions) can be varied to provide different styles of access control and to cater for different requirements.

The authorization files which define the authorities and the correspondence with permissions for the aspects of a particular resource may be stored either with the resources to which they apply or may be stored centrally (i.e. separate from the resources), but in either case the authorisation files are preferably held by the computer system entity which is responsible for this aspect of resource security, organised within a directory tree to enable easy access using a naming convention such as is known in the art. A subject's permissions or "capabilities" are preferably held in system administration files which are accessed by test processes when resource access is requested.

In a preferred embodiment of the invention, file permissions are used to represent resource authorities and directory permissions are used to protect the authorization files which store the mappings between authorities and operating system permissions. A preferred embodiment uses a single authorisation file to represent each aspect of a resource for security purposes.

The invention also provides a computer system including computer resource access authorization control means defining, for computer resources for which access authorisation control is required, permissions which subjects may be given to perform operations in relation to said resources, said means for defining being adapted to define permissions for each of a plurality of different aspects of said resources, particular instances of said resource aspects being characteristic of a particular computer resource.

The invention also provides a computer system having operating system software installed therein, which operating system software's security provision includes a set of definitions of operating system permissions for use in the authorization of subjects of system resources to perform operations in relation to said resources, the system including: means for creating a set of operating system files including a set of definitions of correspondence between said operating system permissions and specified resource authorities for each of a plurality of different aspects of a resource; means for storing said operating system files in association with a resource to be protected; means for setting subjects' authorizations in relation to specific resources using said operating system permissions, thereby to set the authorities which said subjects have in relation to the different resource aspects; and means, responsive to a subject requirement for an operation to be performed, for comparing the subject's operating system permissions with the set of definitions of correspondence within the operating system files, thereby to determine whether the subject is authorised to perform the operation.

If the comparison shows the subject to be authorised, the operation is performed.

The present invention is preferably implemented in application-supporting communications software (often referred to as "middleware"), which can be installed at each node of a distributed network, so as to provide flexibility of authorization on top of the basic operating system facilities without requiring application programs themselves to implement their own security control measures.

DESCRIPTION OF PREFERRED EMBODIMENTS

Figure 2:
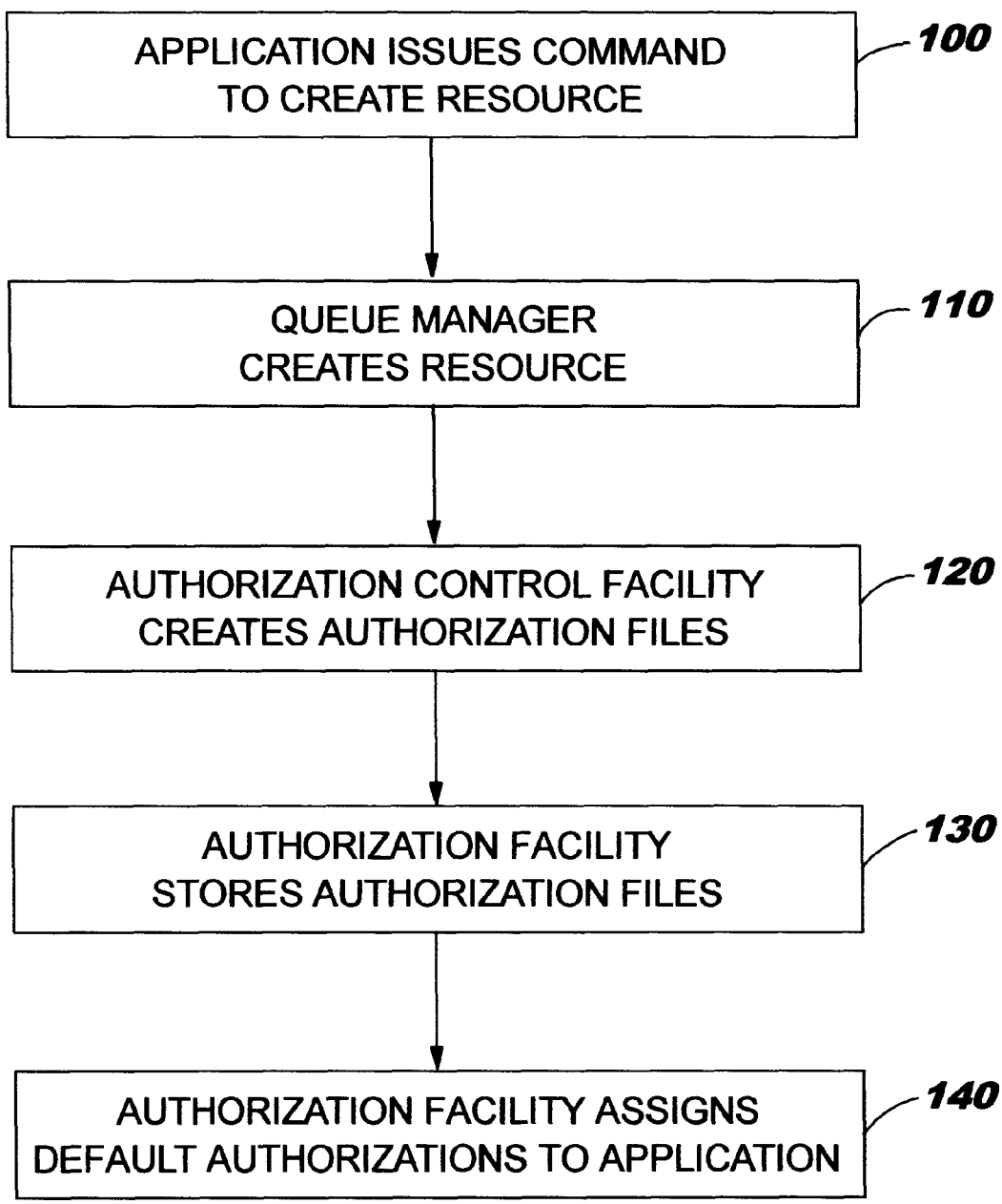

The present invention will now be described in more detail, by way of examples, with reference to the accompanying drawings in which:

FIG. 1 is a schematic representation of the layered structure of a data processing system; and FIG. 2 is an overview representation of the sequence of steps of a method of implementing authorisation control according to an embodiment of the invention.

FIG. 1 is a simplified schematic representation of a computer system showing the layered structure of the major system components. A typical distributed data processing network comprises a plurality of disparate computer systems 10, which may range from desktop systems to mainframe systems, each of which has particular application programs 20 running on the system which applications are adapted to the particular operating system 30 of the system on which they run. To enable the applications to exchange information across the network links 50, the applications themselves often have facilities enabling them to work with applications which run on a different selected operating system and hardware platform. That is, code is written into an application program, which converts or interprets information exchanges sent to/from the application from a first format to a second format. A recent advance on this requirement to re-code individual applications to enable them to communicate with applications on different platforms is the development of application-enabling communications managers 60, which shield the applications from the complexities of the network and manage the work of providing secure inter-program communications. Such application support is provided by IBM's MQSeries commercial messaging software products.

IBM's MQSeries commercial messaging products are described in the following publications which are available from IBM: MQSeries Message Queue Interface Technical Reference, (IBM document number SC33-0850-01) and "IBM Messaging and Queuing Series—An Introduction to Messaging and Queuing" (IBM document number GC33-0850-00), which are incorporated herein by reference. The MQSeries products provide facilities for the management of asynchronous communication using message queues, allowing application programs to communicate with each other simply by "putting" messages onto outgoing message queues to send them and "getting" messages from their incoming queues when they wish to receive them. The applications send and receive messages (having "connected" themselves to specific queue managers and "opened" a message channel) using commands defined as part of an application programming interface (API) 70 on the queue manager. All of the activity associated with reliable message communication other than the issuing of the relevant API commands to "put" and "get" a message is carried out by the MQSeries products—this activity includes maintaining message queues, maintaining the relationships between programs and queues, handling network restarts, and moving messages around the network. To provide this communication management, there is an MQSeries queue manager installed on each processor of the network.

The benefits of the application support provided by these messaging and queuing products includes the removal of constraints on application structure and on program-to-program relationships, the avoidance of programmers having to write communication code, ease of code reuse, the enabling of efficient time-independent scheduling of resources, reduced vulnerability to network failures and assured message delivery.

The resources that a queue manager owns and manages are protected from unauthorised access, to avoid loss or disclosure of the information transferred under the queue managers' control. The following must all be protected from unauthorised access or change by any unauthorised user or process:

Connections to a queue manager;

Access to MQSeries objects such as queues, channels, and processes;

Commands for queue manager administration;

Access to MQSeries messages; and

Context information associated with messages.

IBM's "middleware" application-enabling queue manager product for the AIX operating system platform (which product is known as IBM MQSeries for AIX, and is commercially available from IBM) controls access to queue manager resources through an authorization service installable component known as the Object Authority Manager (OAM) 80. This component and other security provision are described in "MQSeries for AIX—System Management Guide" (IBM document SC33-1373-01) and in "MQSeries Programmable System Management" (IBM document SC33-1482-01), which documents are incorporated herein by reference.

The present invention is implementable as an alternative to the currently available OAM component of the product IBM MQSeries for AIX. The Object Authority Manager (OAM) manages users' authorisation to manipulate MQSeries objects, such as queues, process definitions, and channels. The OAM provides a command interface through which to grant or revoke access authority to an object for a specific group of users. The OAM makes the decision of whether to allow access to a particular resource.

IBM's AIX operating system incorporates the common security features found in most open systems operating systems, including file security for read, write and execute authority at the user and group level, and limitations on certain system management functions to specific system group level authority.

The OAM exploits the security features of the underlying AIX operating system, using AIX user and group ID's. Users can access queue manager objects only if they have the required authority. Managing access permissions to resources is based on user groups (i.e. groups of principals). A user can belong to one or more AIX groups. The OAM maintains authorizations at the level of groups rather than individual users. The mapping of users to group names is carried out within the OAM and operations are carried out at the group level. The authorizations that a user has are the combination of the authorizations of all the groups of which it is a member (i.e. its group set).

The OAM allows control of the access to MQSeries objects through the Message Queue Interface (MQI), which is a high level application programming interface of the MQSeries products. When an application program attempts to access an object, the OAM checks if the user making the request has authorization for the operation being requested. In particular, this entails protecting queues and messages on the queues from unauthorised access. Permission to use queue manager administration commands (e.g. to create a queue), control commands (e.g. in creating a queue manager or starting a command server), or PCF commands is also controlled.

Implementations of the methods and the authorisation service according to the present invention will now be described in detail.

As noted above, computing resources may be considered as instances of specific resource classes. Also noted above is the fact that a number of different aspects or characteristics are generally associated with a resource, with the different aspects possibly requiring different levels of security protection. For example, the resource may be a communications link between two machines and the class to which the link belongs may depend on the particular communications protocol (SNA, TCP/IP, NetBIOS, etc). The class defines the attribute types associated with links of a particular type, but the instances of those attributes are associated with the objects themselves. In addition, there may be data associated with particular objects—which in the case of the communications link example may be data waiting to be transmitted over the link. Also, there is a security aspect which relates to the ability of subjects to grant or revoke authorization to the resource for other subjects (i.e. the authority to modify others' authorizations, or to read others, authorizations, rather than relating to access to the resource itself).

Thus, a typical system resource has the following four different aspects:

Resource Class—The class of resource to which the resource instance belongs;

Resource Attributes—Data, typically configuration information, associated with the particular resource instance;

Resource Security—Attributes concerned with the ability to grant and revoke authorization for the object instance;

Resource Data—Data associated with the object instance.

Although it will be understood by a person skilled in the art that various alternative or additional resource aspects may be defined or identified, the above described aspects are utilised in an embodiment of the present invention which provides flexible resource security as described below.

Mapping Operating System Permissions to Resource Authorities

Operating system permissions are mapped to resource authorities for individual aspects of a system resource. The possible permissions associated with each aspect of a resource are represented by a single operating system file. The following Table 1 defines the correspondence between operating system file permissions and resource authorities for the different resource aspects:

TABLE 1

RESOURCE AUTHORIZATION ASSOCIATED WITH OPERATING SYSTEM PERMISSIONS

| OPERATING SYSTEM PERMISSION | RESOURCE DATA | RESOURCE ATTRIBUTES | RESOURCE SECURITY | RESOURCE CLASS |
|---|---|---|---|---|
| READ | resource data can be viewed | resource attributes can be viewed | authorisations for other users can be viewed | resource instances in the class can be listed |

TABLE 1-continued

RESOURCE AUTHORIZATION ASSOCIATED WITH OPERATING SYSTEM PERMISSIONS

| OPERATING SYSTEM PERMISSION | RESOURCE DATA | RESOURCE ATTRIBUTES | RESOURCE SECURITY | RESOURCE CLASS |
|---|---|---|---|---|
| WRITE | resource data can be modified | resource attributes can be modified | authorisations, other than security authorisations, for other users can be modified | new resource instances can be added to class |
| EXECUTE | resource data can be deleted | unused | security authorisations can be modified for other users | resource instances can be removed from the class |

In essence, read permission allows viewing, write permission allows updating, and execute permission allows deletion.

In this example, each resource class requires a single file to maintain the permissions in the Resource Class column, and each resource instance requires three files to maintain the other permissions. The following general directory structure is used to support storage of authorisation files according to the scheme:

. . . /<resource_class>/class
   . . . /<resource_class>/<resource_name>/data
   . . . /<resource_class>/<resource_name>/attributes
   . . . /<resource_class>/<resource_name>/security where <resource_class> is the name of the class of resource to which the resource belongs, and <resource_name> is the name of the specific instance of the resource to which the authorisation files belong. (The above are partial filenames intended to show the directory structure only—hence the ". . . " representation). The permissions on the file called "class" correspond to the Resource Class column in the table. The permissions on the file called "data" correspond to the Resource Data column in the table. The permissions on the file called "attributes" correspond to the Resource Attributes column in the table. The permissions on the file called "security" correspond to the Resource Security column in the table. This use of the class of the resource and its name as part of the directory name for the authorisation files is useful in that it makes the names of the authorisation files computable from the class and type of the resource.

It is an important benefit if the names of the files used to hold authorisations for a particular resource are derivable from the resource itself, as above, but the choice of directory structures used to hold authorisation files is essentially unrestricted.

As a specific example of the operation of the authorization scheme, we can consider the case where the resource instance is a SNA communication link. Assume that the link is to a host computer called HOST1. The authorization files involved are as follows:

. . . /SNAlink/class
   . . . /SNAlink/HOST1/data
   . . . /SNAlink/HOST1/attributes
   . . . /SNAlink/HOST1/security A user wishing to administer the link needs both view and update authorization for the attributes of the link, which is identified as READ and WRITE access to the authorization file . . . /SNAlink/HOST1/attributes.

A user needing to use the link to read data from the host would need READ access to . . . /SNAlink/HOST1/data.

A user needing to grant other users the ability to use or administer the link would need READ and WRITE authority to . . . /SNAlink/HOST1/security.

A user needing to enable other users grant and revoke access would need EXECUTE authority to the file . . . /SNAlink/HOST1/security.

The above is merely one example—the resources for which subject authorizations are set or tested using this scheme can be of any type (e.g. each of the resources listed previously as resources for which a queue manager program has responsibility).

The above description uses incomplete filenames for simplicity. In an embodiment of the invention in which the authorisation files for resources are kept with the resources to which they apply, the following naming convention has been used for the directory tree which supports authorisation file storage:

<product_root>/authorization/<resource_class>/<resource_name> where <product_root> is a directory suitable as the root for the particular product; "authorisation" is a literal indication of the branch for authorisation information; and <resource_class> and <resource_name> have the same meanings as given previously.

Using this structure, with a top-level directory appropriate to operating systems such as IBM's AIX operating system, the files associated with the SNA link example are:

/var/SNA/authorisation/SNAlink/HOST1/data
   /var/SNA/authorisation/SNAlink/HOST1/attributes
   /var/SNA/authorisation/SNAlink/HOST1/security Use of the "/var" file system to hold data files related to installed products is well known in the art and so needs no further explanation. An alternative to this approach of storing authorisation files with the relevant resources will be described later.

It will be recognised by a person skilled in the art that, although the above-described use of a single operating system file to represent each aspect of a resource for security purposes achieves a reasonably comprehensive provision of flexible resource security, the invention is equally applicable to implementations with fewer operating system files (for simpler security provision, such as where there is no requirement for resource attribute access control at the resource instance level but only at the resource class level) or with more files (for more flexible resource security provision).

As is clear from the above description, improved subject-authorization-granularity for open distributed systems is one aspect of the security flexibility of the present invention. A second aspect of the invention's flexibility is the fact that minor modifications to the specific embodiment described above (in which access to resource attributes is controlled at the resource instance level) will permit attribute access control at the resource class level. The present invention is not limited in scope to the particular mappings described in the above detailed description of an embodiment. Changes in the mappings allow different styles of access control to be implemented to cater for different security requirements, such that the invention is very flexible.

Creation of Authorization Files

Applications build authorisation files automatically when resources are created, in accordance with predefined authorities for a selected set of resource aspects for the resource type. A computer program product in which the authorisation scheme is implemented holds files which define, for each of a plurality of resource types relevant to the product, the authorities relevant to particular resource aspects and the rules specifying how these authorities are to be mapped to the available operating system permissions. When a resource instance is created, these configuration files are accessed to select the appropriate authorities and mappings for the resource type, and to build authorisation files for that resource which contain this authority and mapping information. For example, when a message channel is created by a queue manager product, the access authorisation files for the channel are created in accordance with system-defined rules for message channel aspect authorities. Each type of resource has a specific associated set of rules for authorisation file creation.

Protecting the Authorization Files

Permissions on the directories containing files are not used to represent resource authorizations, but rather are used to protect the authorization files themselves. When a subject is given authorization to a resource, this may inherently involve the subject getting update authority to one or more authorization files. It is important that nothing that the subject can do given that authority represents a security or integrity exposure to the system. Therefore, directories are used to protect the authorization files. Subjects are not given READ or WRITE authority to the directories which contain the authorization files. Consequently, they cannot directly create or delete authorization files. They are given EXECUTE authority to the directories (this being necessary or they would not have any access authority to the authorization files).

Since subjects may be able to read data from or to write data to the authorization files, the authorization files are not used to store any data. Each system is provided with means for periodically checking that the authorization files remain empty of data, and to empty them if not.

A potential security exposure arises from subjects having EXECUTE authority for authorization files. The problem and its solution will now be described. If a subject has WRITE and EXECUTE authority to an authorization file, then the subject could in principle copy a script or program into the file and then execute it. If that authorization file were to be owned by a privileged subject ID, then the subject would be able to execute the script or program with an authority which may be greater than that to which he was entitled. Because the present invention uses permissions to mean different things from the normal meaning defined for the operating system, it is necessary to protect against a user seeking to manipulate the authorisations of the scheme to obtain unauthorised access to resources. This potential problem is solved by authorization files never being owned by subject ID's with privilege beyond that associated with the resource which they protect. An example of a privileged ID in the UNIX environment is the subject ID name "root", which identifies a subject who can operate outside of usual system restrictions—so to avoid the aforementioned security exposure, the root ID may not own an authorization file. An alternative solution will be mentioned later.

Establishing and Managing Subject Authorizations

Permissions on the authorization files can be managed directly by a system administrator, using the standard open system platform security commands, but this becomes increasingly difficult as the number of authorisation files per object increases. Thus, the preferred implementation of the invention uses an authorisation administration application program to perform the necessary operations on behalf of an administrator. Use is made of system level function calls which allow application programs to manage file permissions. A simple management application maps a requested authorisation to the particular file permission bits involved. Users then work with resource names, user names and authorities, leaving the application to derive the authorisation file names and the permission bits (from the resource class and name), and to apply the appropriate permissions automatically. Such an application is effectively an implementation of the relevant resource permission table of mappings (such as is exemplified by Table 1 above).

To further save on unnecessary administration effort, a subject which creates a resource instance is automatically given certain default permissions by the administration application program. For example, an owner subject may automatically get permission to modify resource attributes; a queue manager which creates a message channel definition for message communication between application programs is given the necessary authority to manage the channel. It is equally possible to build the administration application such that the subject's group receive default permissions automatically when resources are created by a subject within the group.

Since the administration application makes use of the programming interfaces which are already provided by open systems platforms and which already implement the necessary commands, the development of the application is a simple matter for a person skilled in the art, and so further description is unnecessary here. However, use of the standard open system security commands will now be described for completeness.

The standard chmod command for changing permissions on UNIX files can be used by systems administrators to set authorisations on files. For example, an administrator setting up a new SNA link to a host machine may wish to authorize one set of users to use the link and another set to administer it. Two groups of users are created using standard commands (such as mkgroup). An alternative is to edit the systems administration files. Some open systems platforms provide menu driven mechanisms which can be used for these operations. Suppose the two new groups are called SNAadmin and SNAuser. The administrator needs READ and WRITE permissions for the resource attributes for the new link, whereas users need READ, WRITE and EXECUTE permissions for the resource data. The commands required to establish these permissions for the groups concerned are:

chgrp SNAadmin /var/SNA/authorisation/SNAlink/HOST1/attributes
chgrp SNAuser /var/SNA/authorisation/SNAlink/HOST1/data
chmod 760 /var/SNA/authorisation/SNAlink/HOST1/attributes
chmod 770 /var/SNA/authorisation/SNAlink/HOST1/data This example uses an authorisation file structure which keeps the files with the resources, and which sets authorisations according to whether a subject is the resource owner, a member of the same subject group as the owner, or outside of the group.

To clarify the meaning of the above commands (which are examples of open operating system commands such as are known in the art), it may be noted that open operating system permissions are represented in the commands by numerals, using the following representation:

| Owner<br>r w x | Group<br>r w x | Any other<br>r w x | Permissions |
|---|---|---|---|
| 111 | 110 | 000 | |
| 7 | 6 | 0 | Attributes |
| 111 | 111 | 000 | |
| 7 | 7 | 0 | Data |

So, the latter example chmod command shown above gives the resource owner READ (r), WRITE (w), and EXECUTE (x) permissions for the data aspect of the resource; the other members of the owner's subject group are given the same access permissions to the data; and any other subject is given no permission.

To add a new user and to give them authority to administer the link simply requires adding group SNAadmin to their group list. Likewise, adding SNAuser to a user's group list would allow them to use the link.

This example is simple because all users of the link have the same authorisation. In this case, a given file can have only one user and one group associated with it—more sophisticated schemes are implemented by using more authorisation files.

Authorization files are backed up regularly by the system responsible for the resource, to ensure that their permissions can be recovered in the event of system failure.

Steps in the operation of an authorisation control facility according to the invention will now be described by way of example, with reference to FIG. 2. System resources can be created in response to an application program command. For example, an application may issue 100 the command MQOPEN via the MQI (see earlier) to establish access to a message queue, which may cause an instance of a queue to be created 110 by the responsible queue manager. The authorisation control facility uses the predefined definitions of the possible message queue authorities and the mappings between these authorities and the standard READ, WRITE and EXECUTE permissions to build 120 a set of authorisation files which include these definitions.

The authorisation files are then stored 130 for future access by the authorisation facility, the particular organisation of authorisation file storage making use of a directory structure with the queue manager identifier as its root and with individual resources within a resource class being identified firstly by the resource class name and subsequently by their resource name.

Authorizations for the application program which initiated creation of the resource are set 140 in accordance with the predefined default permissions (for example, the application may be permitted to put messages onto the message queue using the MQI command MQPUT). Further authorisations in relation to this queue which are required but which are not established automatically are then set by a systems administrator using the simple administration application referred to previously.

Testing Authorizations

When a subject requests access to a particular resource, the subject's authorization is tested by system level function calls (see below). This enables an application to discover whether a specific subject has a particular class of access to a given file.

IBM's AIX operating system and many other open systems operating systems provide standard methods for allowing applications to test the access rights which users have against files. The most common mechanisms allow the user associated with the currently executing program to have their access rights checked. The standard function provided is called access(), this being defined for the most common open systems standards (including X/Open XPG standards, POSIX and UNIX System V Interface definition).

Using the access() function, code running in an application can test the kind of access required to various files. For example, using the SNA link example from above, if a systems management application needs to check whether the user running it had authority to change the link attributes for HOST1, it could use the access() function to test whether the user had READ and WRITE authority to the file . . . /SNAlink/HOST1/attributes.

When a program needs to test the access which an arbitrary user (i.e. a user other than the user of the current process) has to a given file, an additional test method is sometimes required, as the open operating systems do not provide a standard function for this. Arbitrary testing is required, for example, when a server is doing work on behalf of another user. Servers usually run with more privilege than the users for whom they are working. The server makes the relevant checks to see if the user is authorised to perform the requested action. It prevents unauthorised access, despite the fact that it itself is running with enough authority to perform the action.

Although there are no really standard open systems functions for performing the arbitrary user test, all of the required information exists in the authorisation files. On operating systems which do not provide functions for checking arbitrary users, the following scheme is used:

Access the permission information on the relevant authorisation files using the standard stat() function.

Extract the following information from the resulting data about the file:

The id of the user who owns the file

The group id associated with the file

The permission bits associated with the file

Using this information, together with the user and group id's of the user whose access is to be tested, run the following algorithm to yield the access rights:

set the resulting access rights to the "other user" permissions returned by the stat() function; and if the user being tested has the same group id as the authorisation file, logically OR the resulting access rights with the group permissions returned by stat(); and if the user being tested has the same user id as the authorisation file, logically OR the resulting access rights with the user permissions returned by stat().

The resulting access rights consist of a three bit filed with the following meanings:

Bit 0 (most significant): The user has READ authority to the authorisation file.

Bit 1: The user has WRITE authority to the authorisation file.

Bit 2 (least significant): The user has EXECUTE authority to the authorisation file.

As noted previously, users may be granted authorisations directly, as owners of authorisation files, because of the groups to which they belong, or as a result of public authorisation granted to all users. All of these methods are supported by the test method described above.

Exploiting Access Control Lists

The present invention is equally applicable to those open system platforms which support Access Control Lists (ACL's)—for example IBM's AIX operating system. ACL's allow READ, WRITE and EXECUTE permissions to be specified for a file, but give more flexibility in the manner in which it is assigned. For example, whereas access to a file can be defined for only one group of users without an ACL, access for any number of groups can be specified when an ACL is available. The only difference when ACL's are employed is in the system function calls used to manage the authorization files. The checks performed on file access are unchanged.

While a particular embodiment of the invention has been described in detail, it will be appreciated by a person skilled in the art that other implementations and modifications are within the scope of the present invention. Significant examples of such modifications have already been mentioned, such as the invention being implemented using a different set of resource aspects to those described in detail herein and the defined authorities or mappings being varied to suit different security requirements. As mentioned earlier, a plurality of authorization files may be used for each different resource aspect or less than one file per aspect may be used depending on the particular authorisation scheme which is required to provide satisfactory security.

In the specific embodiment of the invention which has been described in detail, authorisation files are stored with the resources to which they apply. An alternative approach stores all authorisation files together, separately from the resource files. In an embodiment of the invention which uses this central storage approach, the following naming convention is used for the directory tree:

<auth_root>/<product_name>/<resource_class>/<resource_name> where <auth_root> is the name of a directory suitable for all authorisation information; <product_name> is a unique name distinguishing files for this product from others; and <resource_class> and <resource_name> have the same meanings as given previously. Given this structure, one embodiment of the invention has the following files associated with the SNA link example:

/var/<auth_root>/SNA/SNAlink/HOST1/data
/var/<auth_root>/SNA/SNAlink/HOST1/attributes
/var/<auth_root>/SNA/SNAlink/HOST1/security.

Once again, this arrangement is suitable for operating systems such as IBM's AIX operating system which use the /var filesystem to hold data files related to installed products.

Each of the naming conventions described (for either centralised storing of authorisation files or storing with the resources to which they apply) has its advantages. Storing security information with the resources makes maintenance somewhat simpler. To ensure that no information is lost when backups of resource files are taken, backups of the authorisation files also need to be made. This is marginally more difficult to achieve when authorisation files are held separately from the resources. However, collecting the authorisation files together may allow them all to be kept on physical data storage (disks) with performance or security characteristics particularly appropriate for that kind of use. The choice between the two approaches is a pragmatic one as the invention supports either, and a variety of other approaches.

The embodiment of the present invention which is described in detail above includes a restriction on which subject ID's may own authorization files to prevent execute authority for authorization files presenting a security exposure. An alternative solution to this restriction rule is for the described mapping of operating system permissions to resource authorities to be modified to avoid use of the EXECUTE permission at all.

What is claimed is:

1. A method for providing increased granularity of resource access authorization control for computer resource security for operating systems in which a set of operating system permissions are defined for use in the authorization of subjects to perform operations in relation to specific resources, the method comprising:

creating a set of files including a set of definitions of correspondence between the defined operating system permissions and specified resource authorities for each of a plurality of different aspects of a resource, said definitions defining separate resource authorities for said different aspects and said different aspects comprising a plurality of resource aspects selected from the group comprising resource data, resource class security attributes, configuration information and other attributes, such that (wherein) particular instances of said resource aspects are characteristic of a particular computer resource;

storing said created files for association with a resource to be protected; and setting subjects' authorizations for resource access for each of said resource aspects using the defined operating system permissions, thereby setting, via said defined correspondences within said created files, the authorities which said subjects have in relation to the different resource aspects at the level of granularity of the resource aspects.

2. A method according to claim 1, including:

responsive to a subject requesting performance of an operation in relation to a protected resource, comparing the operating system permissions of the subject with said set of definitions of correspondence within the created files to determine whether the subject is authorized to perform the operation in relation to the protected resource; and permitting the operation to be performed if the subject is authorized and rejecting the request if the subject is not authorized.

3. A method according to claim 1 or claim 2, for use with operating system software in which operating system files are organised in directories and for which both file permissions and directory permissions are defined, wherein operating system file permissions are mapped to resource authorities by the definitions of correspondence within said created files and operating system directory permissions are used to protect said created files.

4. A method according to claim 3, for use with operating system software in which the defined directory permissions are read, write, and execute permissions, wherein said step of setting subjects' authorizations includes the step of giving subjects execute permission to the directories which contain said created files but wherein read and write permissions to said directories are not given.

5. A method according to claim 1, wherein a single created file is used to represent the resource authorities for each resource aspect.

6. A method according to claim 1 wherein said step of creating files is performed automatically when a resource is created, using a predefined set of said definitions of correspondence.

7. A method according to claim 1, wherein a subject which creates a resource has default authorizations automatically assigned to it and/or to its subject group when the resource is created.

8. A method according to claim 1, wherein the resource aspects for which resource authorities are specified are the resource class, resource attributes, resource data and resource security.

9. A method for providing increased granularity of resource access authorization control in a computer system, the method comprising:

for each of a set of computer resources which are to be protected, identifying a plurality of resource aspects selected from the group comprising resource data, resource class, security attributes, configuration information and other attributes, particular instances of which are characteristic of a particular computer resource;

defining resource authorities which subjects may have separately for each of said plurality of resource aspects of a particular resource, and storing within authorisation files associated with said resources definitions of the correspondence between said defined resource authorities and available operating system permissions, for each of said plurality of resource aspects; and setting subject's authorizations for resource access for each of said resource aspects using said available operating system permissions, thereby to set, via said defined correspondences between defined resource authorities and available operating system permissions, the authorities which subjects have in relation to the different resource aspects at the level of granularity of the resource aspects.

10. A computer program product comprising computer readable program code stored on a data carrier, including a resource access authorisation control facility for use with operating system software having security facilities including a set of definitions of operating system permissions for use in the authorization of subjects of system resources to perform operations in relation to said resources, the control facility including:

means for creating a set of files including a set of definitions of correspondence between said operating system permissions and specified resource authorities for each of a plurality of different aspects of a resource, said definitions defining separate resource authorities for said different aspects and said different aspects comprising a plurality of resource aspects selected from the noun comprising resource data, resource class, security attributes, configuration information and other attributes, such that (wherein) particular instances of said resource aspects are characteristic of a particular computer resource;

means for storing said created files in association with a resource to be protected; and means for setting subjects' authorizations for access to specific resources for each of said resource aspects using said operating system permissions, thereby setting, via said defined correspondences within said created files, the authorities which said subjects have in relation to and at the level of granularity of the different resource aspects.

11. A computer program product according to claim 10, including:

means, responsive to a subject requirement for an operation to be performed, for comparing the subject's operating system permissions with the set of definitions of correspondence within the created files, thereby to determine whether the subject is authorized to perform the operation.

12. A computer program product according to claim 10 or claim 11, wherein the set of definitions of correspondence between said operating system permissions and specified resource authorities are predefined within the control facility for a plurality of different resource types, said control facility being adapted to create said set of files for a resource automatically when said resource is created.

13. A computer program product according to claim 10, which is adapted to automatically assign default authorizations in relation to a resource to a subject and/or to the subject group when the subject creates the resource.

14. A computer system having operating system software installed therein, which operating system software's security provision includes a set of definitions of operating system permissions for use in the authorization of subjects of system resources to perform operations in relation to said resources, the system including:

means for creating a set of files including a set of definitions of correspondence between said operating system permissions and specified resource authorities for each of a plurality of different aspects of a resource, said definitions defining separate resource authorities for said different aspects and said different aspects comprising a plurality of resource aspects selected from the group comprising resource data, resource class, security attributes, configuration information and other attributes, such that (wherein) particular instances of said resource aspects are characteristic of a particular computer resource;

means for storing said created files in association with a resource to be protected;

means for setting subjects' authorizations for access to specific resources for each of said resource aspects using said operating system permissions, thereby setting, via said defined correspondences within said created files, the authorities which said subjects have in relation to and at the level of granularity of the different resource aspects; and means, responsive to a subject requiring an operation to be performed in relation to a resource, for comparing the subject's operating system permissions with the set of definitions of correspondence within the created files, thereby to determine whether the subject is authorised to perform the operation.

15. A computer system including:

computer resource access authorisation control means for defining, for computer resources for which access authorisation control is required, authorities which subjects may be given to perform operations in relation to said resources, said means for defining being adapted to define authorities separately for each of a plurality of different aspects of said resources, wherein said different aspects comprise a plurality of resource aspects selected from the group comprising resource data, resource class, security attributes, configuration information and other attributes, such that particular instances of said resource aspects are (being) characteristic of a particular computer resource;

means, responsive to said resource access authorisation control means, for storing within authorisation files associated with said resources definitions of correspondences between said defined resource authorities and available operating system permissions, for each of a plurality of said resource aspects; and means for setting subject's authorizations for resource access for each of said resource aspects using said available operating system permissions, thereby to set, via said defined correspondences between defined resource authorities and available operating system permissions, the authorities which subjects have in relation to the different resource aspects at the level of granularity of resource aspects.

* * * * *